(12) United States Patent
O'Herlihy et al.

(10) Patent No.: US 11,328,281 B2
(45) Date of Patent: May 10, 2022

(54) POS TERMINAL

(71) Applicant: EVERSEEN LIMITED, Cork (IE)

(72) Inventors: Alan O'Herlihy, Cork (IE); Bogdan Ciubotaru, Cork (IE); Razvan Cioarga, Bihor (RO); Dan Pescaru, Timisaora (RO); Gui Vasile, Timisoara (RO); Ovidiu Parvu, Timisoara (RO); Ciprian Petru David, Satu Mare (RO); Constantin Petru Sacrieru, Timis (RO); Cosmin Cernazanu Glavan, Timis (RO); Gavin Doyle, Cork (IE)

(73) Assignee: EVERSEEN LIMITED, Cork (IE)

( * ) Notice: Subject to any disclaimer, the term of this patent is extended or adjusted under 35 U.S.C. 154(b) by 226 days.

(21) Appl. No.: 15/566,300

(22) PCT Filed: Apr. 7, 2016

(86) PCT No.: PCT/EP2016/057664
§ 371 (c)(1),
(2) Date: Oct. 13, 2017

(87) PCT Pub. No.: WO2016/166015
PCT Pub. Date: Oct. 20, 2016

(65) Prior Publication Data
US 2018/0096332 A1 Apr. 5, 2018

(30) Foreign Application Priority Data
Apr. 16, 2015 (GB) ........................ 1506494

(51) Int. Cl.
*G06Q 20/20* (2012.01)
*G08B 7/06* (2006.01)
(Continued)

(52) U.S. Cl.
CPC ......... *G06Q 20/208* (2013.01); *G06Q 20/209* (2013.01); *G06T 7/62* (2017.01);
(Continued)

(58) Field of Classification Search
CPC ...................................................... G06Q 20/20
(Continued)

(56) References Cited

U.S. PATENT DOCUMENTS

2003/0024982 A1* 2/2003 Bellis, Jr. ............... A47F 9/047
235/383
2006/0043193 A1* 3/2006 Brock ..................... G06K 7/10
235/462.41
(Continued)

FOREIGN PATENT DOCUMENTS

JP 2014132501 A * 7/2014

OTHER PUBLICATIONS

JP2014084772—Miyata Kotaro—Translation (Year: 2014).*
(Continued)

*Primary Examiner* — Luna Champagne

(57) ABSTRACT

A POS terminal for a retail environment, comprising a data acquisition device for generating event data from a user scan of a product along a scanning path of the POS terminal, said path comprising an entry point and an exit point; and a processing unit for receiving at least a portion of event data from the data acquisition device and process the event data according to a set of predefined rules, to determine a control parameter for the POS terminal, generate a user alert based on the control parameter and communicate the user alert to the end user; the data acquisition device comprising: a
(Continued)

universal product code, U PC, scanner; a plurality of illumination units arranged along the scanning path for illuminating the product; a plurality of sensors for sensing event data including a shape, size and volume of the product and a parameter of a hand of the user as the product is scanned along the scanning path.

29 Claims, 4 Drawing Sheets

(51) Int. Cl.
G07G 1/01 (2006.01)
G07G 1/00 (2006.01)
G06T 7/62 (2017.01)
G08B 5/36 (2006.01)
G08B 21/18 (2006.01)

(52) U.S. Cl.
CPC ......... *G07G 1/0063* (2013.01); *G07G 1/0072* (2013.01); *G07G 1/01* (2013.01); *G08B 5/36* (2013.01); *G08B 7/066* (2013.01); *G08B 21/182* (2013.01); *G06T 2207/30232* (2013.01)

(58) Field of Classification Search
USPC .......................................................... 705/23
See application file for complete search history.

(56) References Cited

U.S. PATENT DOCUMENTS

| 2008/0121702 | A1* | 5/2008 | Fortenberry | ....... G01G 19/4144 |
| | | | | 235/383 |
| 2013/0001295 | A1 | 1/2013 | Goncalves | |
| 2014/0028837 | A1* | 1/2014 | Gao | ................... G06K 7/10792 |
| | | | | 348/136 |
| 2015/0060552 | A1* | 3/2015 | Rambler | ............ G06K 7/10574 |
| | | | | 235/470 |

OTHER PUBLICATIONS

ISA/EPO, "International Search Report," Application No. PCT/EP2016/057664, dated Jun. 9, 2016, 3 pages.

ISA/EPO, "Written Opinion of the International Searching Authority," Application No. PCT/EP2016/057664, dated Jun. 9, 2016, 7 pages.

* cited by examiner

POS TERMINAL

CROSS-REFERENCE TO RELATED APPLICATION

The present application is a United States nationalization under 35 U.S.C. § 371 of International Patent Application No. PCT/EP2016/057664, filed Apr. 6, 2016, which claims priority to Great Britain Patent Application 1506494.2, filed Apr. 16, 2015, which is incorporated herein by reference for all purposes.

TECHNICAL FIELD

The present invention relates to a POS terminal and in particular a complementary flow regularisation system for a POS terminal in a self-checkout retail environments.

BACKGROUND ART

The development of self-checkout Point of Sale systems, whether cash, or cashless, has led to a significant increase in the efficiency of the purchasing process in a retail environment for the retail consumer. Several solutions have been proposed for an effective self-checkout system, however, many of these lead to confusion for the consumer. To mitigate this confusion guidance systems have been developed. The aim of these guidance systems is to reduce retail shrinkage. The aim of the guidance system is to minimize errors and avoid incidents by directing customers through the purchasing process. These guidance systems address only unintentional errors but fail in more complex scenarios. Complex scenarios include loss prevention due to shop lifting, irregularities in scanning, intentional shop lifting, fraud and disguising thereof, multiple people in the POS terminal area or unexpected and ambiguous client actions.

With existing self-checkout scenarios, such as that shown in FIG. 1, a customer scans items starting from an object pick-up area 102 across a scanning area 104 having a conventional laser scanner apportioned thereon, finally placing the object on an object drop off area where the object which has just been scanned is compared with the object which has been dropped off. A successful scan is generally acknowledged by an audible and/or visual alert from the machine, such as a "beep" or other sound. If the bar code has been scanned correctly the product information appears on a vertical display or heads up display. If the bar code has not been scanned correctly there is no audible alert and/or information displayed on screen. Audible alerts also guide the customer/user to place the scanned objects in the object drop off area 106. However, the verification in such a system is prone to errors. In addition, the scanning process can be frustrating for customers who need to repeatedly swipe the products from the pick up to drop off areas to ensure a correct scan. To increase the efficiency, additional barcode scanners have been placed along the vertical surface of the scanner orthogonal to the scan area 104. However, there is still a level of frustration for the end customer. Furthermore for the retailer the validation with these systems remains flawed and relies on the observance of a check out supervisor or a camera system.

It is therefore an aim of the present invention to provide an active guidance system which addresses these unintentional errors but also the more complex scenarios. It combines an active guidance system with surveillance and incident detection strategies in order to prevent both intentional and unintentional incidents in a self-checkout environment. It is a further aim of the invention to use feedback to ensure flexible guidance through the self-checkout system.

SUMMARY OF INVENTION

The invention as described herein with reference to the appended claims includes a POS terminal for a retail environment, comprising
  a data acquisition device for generating event data from a user scan of a product along a scanning path of the POS terminal, said path comprising an entry point and an exit point; and
  a processing unit for receiving at least a portion of event data from the data acquisition device and process the event data according to a set of pre-defined rules, to determine a control parameter for the POS terminal, generate a user alert based on the control parameter and communicate the user alert to the end user;
  the data acquisition device comprising:
  a universal product code, UPC, scanner;
  a plurality of illumination units arranged along the scanning path for illuminating the product;
  a plurality of sensors for sensing event data including a shape, size and volume of the product and a parameter of a hand of the user as the product is scanned along the scanning path.

The POS terminal in accordance with the present invention provides improved feedback for the customer and the retail operator. In addition to the bar code scanning a plurality of illumination units arranged along the scanning path facilitate guiding the user through the self checkout process and the plurality of sensors detect additional information such as volume, shape, distance, and parameters relating to the customer to ensure a more reliable self-checkout process than has previously been possible. The use of the illumination units in a controlled manner through feedback from the control parameters generated in response to event data from the sensors ensures a stable active background which further ensures accuracy of the scanning process.

The plurality of sensors may comprise a distance detection subsystem for detecting a distance of the product from the distance detection subsystem and wherein the processing unit is arranged to generate a control parameter based on a comparison between the distance detected and a predefined threshold and generate user alert if the distance is greater than the threshold.

The plurality of sensors may comprises a volume detection subsystem for determining a volume of at least a portion of the product and wherein the processing unit is arranged to generate a control parameter based on the comparison between the determined volume and a predefined volume and generate a user alert if the comparison is outside a limit defined by an upper or lower threshold.

The plurality of sensors may comprise a shape detection subsystem for determining a shape of at least a portion of the product and wherein the processing unit is arrange to generate a control parameter based on the comparison between the determined shape and a predefined shape and generate a user alert if the comparison is outside a limit defined by an upper or lower threshold.

The shape detection system may be further arranged to scan the user of the terminal.

The user alert may comprise an illumination pattern and communicating the user alert comprises illuminating one or more of the plurality of illumination units to guide the user along the scanning path. The illumination pattern provides a known and therefore stable background to the sensors for the collection of event data.

Generating a user alert may comprise selecting an illuminating unit of the plurality of illuminating units based on the control parameter and wherein communicating the user alert may comprise illuminating the selected illuminating unit. The controlled illumination units provide a stable background and also a controlled user guidance system.

The plurality of illumination units may be arranged to display a predetermined image pattern to the user.

The processing unit may be arranged to apply a modulation signal to the predetermined image.

The at least one sensor may comprise an input device having one or more image/infrared sensors, a two-dimensional camera, an infrared camera, or a three dimensional camera.

The terminal may further comprise a communication device for transmitting an audible alert to the user.

The communication device may comprise a display, a projector, a two way speaker, a microphone, or a loud speaker.

The processing unit may further comprise a video analysis module. The video analysis module may be arranged to obtain video data of the user of the terminal, or of the surrounding area including persons accompanying the user or in proximity to the user. The video analysis module may also obtain video of the transaction. The video obtained may be used to augment the event data obtained by the sensors.

The plurality of illumination units may comprise four illumination units arranged such that a first illumination unit is arranged at the entry point (202); a second illumination unit is arranged at the exit point (206) of the scanning unit, a third illumination unit (204) is arranged parallel to the scanning path and a fourth illumination unit (208) is arranged perpendicular to the third illumination unit.

The plurality of sensors may comprise a lighting system, for example a laser guided lighting system. The lighting system may be used with the sensors and the illumination units to guide the user through the scanning process and/or to provide the stable active background for the scan.

The processing device may comprise a laptop; a personal computer, a tablet computer, a personal communication device, a wireless communication device or a microcontroller.

The terminal may further comprise at least one of a cash dispenser, a graphical user interface, a touch screen, a cashless payment device, a speaker or a microphone.

The illumination units may further comprise one or more of a Light Emitting Diode (LED) mat or a Liquid Crystal Display (LCD).

The processing unit may be arranged to for controlling an illumination level of each of the plurality of illumination units in response to the control parameter.

The processing unit may comprise a video analysis module, a guidance control module and a flow regularisation module.

A further embodiment of the invention includes a system for flow regularisation in a self-checkout retail environment, comprising: a guidance module, a video analysis module and a flow regularisation module, wherein the video analysis module is arranged to obtain event data comprising user information relating to an action of a user scanning a product and product information relating to the product, said product information including a volume of the product and providing the event data to the flow regularisation module and the guidance module;

the flow regularisation module being arranged to determine a control parameter for the guidance module based on a comparison between the event data and predefined data relating to a retail transaction; and wherein the guidance module is arranged to implement an active guidance system to guide the user based on the determined control parameters.

The system may be integrate-able with existing self-checkout environments.

The guidance module may comprise an active background, said active background being arranged to display a light pattern in response to the control parameter.

The light pattern may be modulated by the guidance module.

The light pattern may be detectable by a camera.

The active guidance system may be a combination of illuminations or patterns which guides the user through a scanning path from an entry point to an exit point. The guidance is active as it is updated during the scanning process in response to the actions of the user.

A further embodiment includes a method of for flow regularisation in a self-checkout retail environment; comprising obtaining event data comprising user information relating to an action of a user scanning a product and product information relating to the product, said product information including a volume of the product;

determining a control parameter for the guidance module based on a comparison between the event data and predefined data relating to a retail transaction; and implementing an active guidance system to guide the user based on the determined control parameters.

Implementing an active guidance system may comprise displaying a light pattern in response to the control parameter.

The method may further comprise modulating the light pattern.

There is also provided a computer program comprising program instructions for causing a computer program to carry out the above methods as described above which may be embodied on a record medium, carrier signal or read-only memory.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning consistent with the particular concepts disclosed herein.

BRIEF DESCRIPTION OF DRAWINGS

Various non-limiting embodiments of the technology described herein will not be described with specific reference to the following figures. It should be appreciated that the figures are not necessarily drawn to scale.

DESCRIPTION OF EMBODIMENTS

The aspects of the technology mentioned above, as well as additional aspects, will now be described in greater detail. The aspects may be used individually, all together or in any combination of two or more, as the technology is not limited in this respect.

Figure 2:
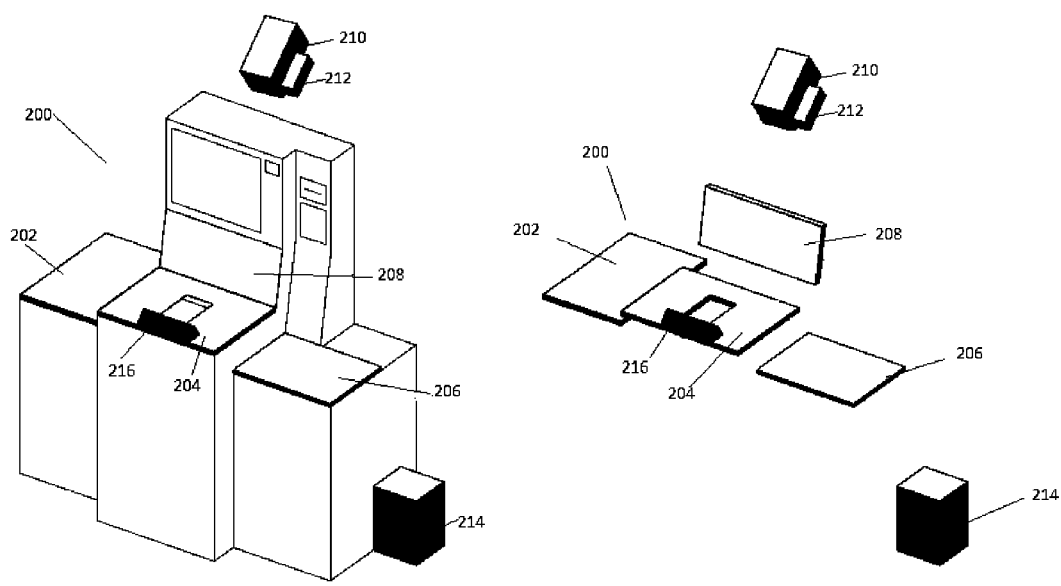
FIG. 2 shows an improved point of sale terminal in accordance with the present invention.

As shown in the exemplary embodiment of FIG. 2, the self-checkout or point of sale, POS terminal 200 of the present system includes a data acquisition device 200 for a POS terminal which in use generates event data as an output of a user implemented product scan. A scanning path is defined from an entry point, which may be an object pick up area, 202 for example to an exit point, which may be for example, an object drop off area 206. It will be appreciated that whilst in FIG. 2 the scanning path goes from the left hand side of the POS terminal to the right hand side, the scanning path may equally be in the opposite direction, i.e. from right to left.

The terminal of FIG. 2 also comprises a processing unit 214 which interprets or processes the event data. Event data is collected by the sensors. Sensors include a distance detection subsystem, a volume detection subsystem and a shape detection subsystem. The processing unit 214 while shown adjacent to the terminal in FIG. 2 may be local to the unit, integral to the unit or remote from same. In a remote configuration, information is transmitted from the terminal to the remote processing unit.

Figure 1:
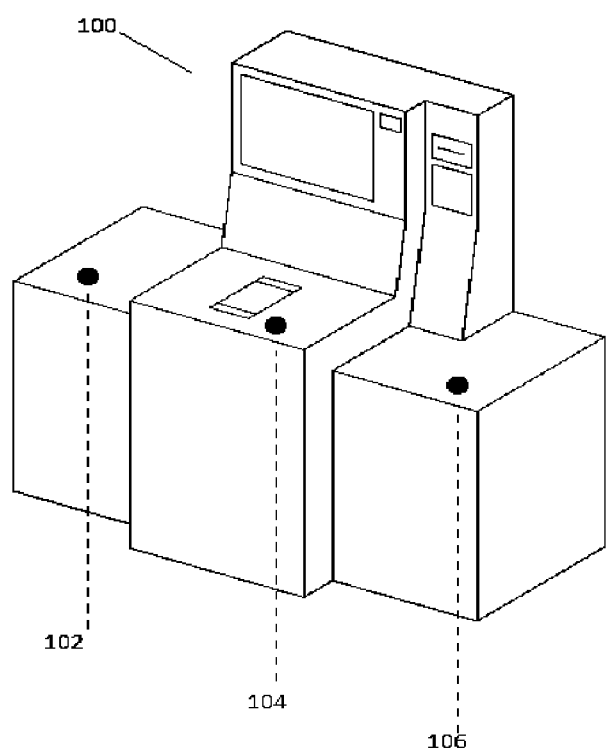
FIG. 1 shows a conventional point of sale terminal.

The data acquisition device in accordance with the invention comprises a universal product code (UPC) scanner 218, such as a bar code scanner or the like. It will be appreciated that the bar code scanner scans a bar code on the product and extracts the relevant information therefrom to provide pricing and other information to the retailer and the consumer. The data acquisition device also comprises a plurality of illumination units 202, 204, 206, 208. The illumination units are overlaid or incorporated within the pickup, scan or drop areas of a conventional POS such as that shown in FIG. 1. While four illumination units are shown in FIG. 2, it will be appreciated that any number of illumination units may be used. In addition, one or more illumination units may be combined at each location to provide an illumination surface.

The illumination units, as shown in FIG. 2, are located at the entry point 202, the exit point 204 of the scanning path, parallel to the scanning path 204, and perpendicular to the scanning path 208. The illumination units may be light emitting diodes (LED) mats, liquid crystal displays, LCDs or any other device with a planar surface.

The illumination levels of the illuminations units may be controllable. The illumination level of the illumination units may be set remotely by a controller of the retail system at manufacture of the illumination units, or to a default level on power up for example. The illumination level of the illumination units may be altered or reset in response to the control parameters generated by the processing unit processing event data relating to the product scan. Illumination levels of the illumination units may be set at the same or different illumination levels.

Figure 3:
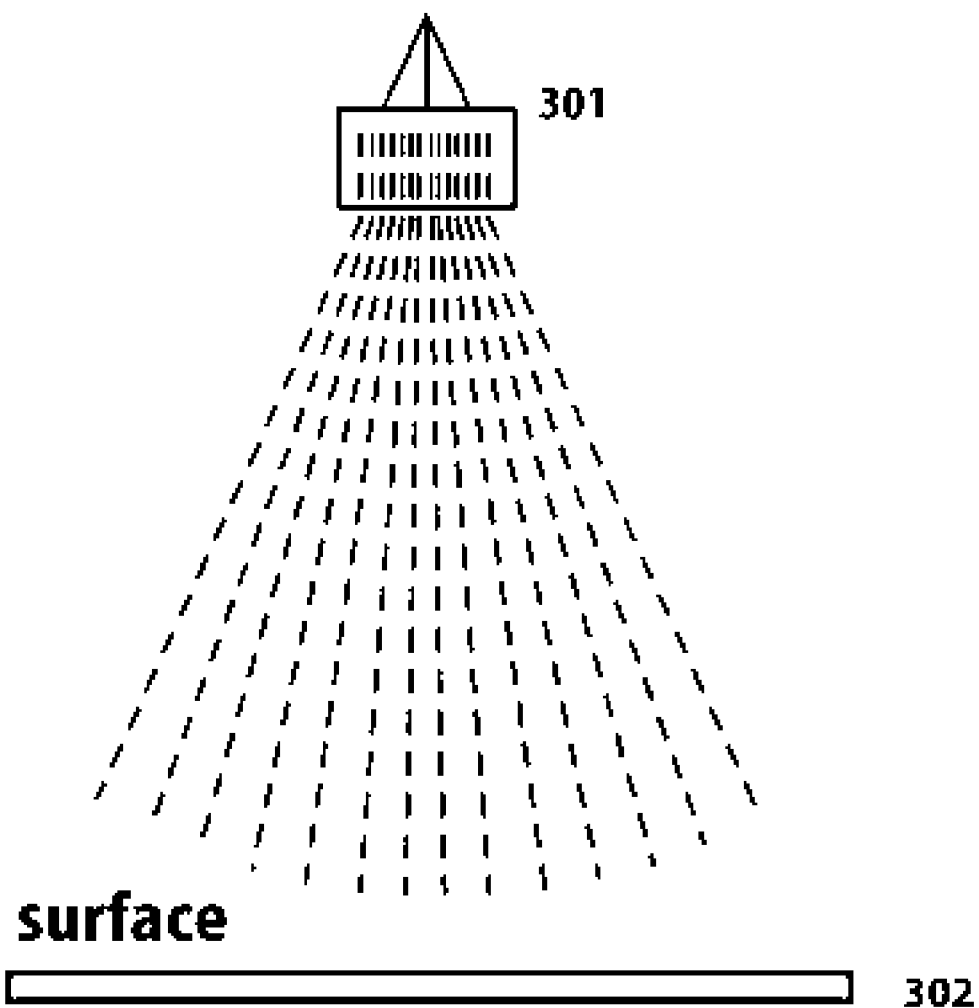
FIG. 3 illustrates a suitable lighting system for illuminating the scan area in accordance with the present invention.

The data acquisition device may also incorporate a lighting system 212. The lighting system may optionally be a laser guided lighting system such as that shown in FIG. 3. A light source 301 is arranged to emit a laser light across the surface 302 of the POS terminal.

The lighting system 210 is useable to establish a user friendly process for the customer when scanning the acquired items on a self-service POS terminal. It will be appreciated that the lighting system, will help the customer in establishing a systematic series of operations when operating a self-service till, for example by indicating how/where to place items on the pick area, the direction of movement along the scanning path, the drop area for the product after it has been scanned. In a preferred embodiment the lighting system 210 is integrated with the global environment sensors.

In one configuration a lighting system 210 is placed at 1.5 meters above the till, perpendicular to a bar-code scanning area. The lighting system of FIG. 4, for example, may be arranged to define "special" zones on the terminal surface for example, a pick area from where a customer selects the product to be scanned, a scan area where the product is scanned, a drop area where the product is dropped. The lighting system may also be arranged to animate icons to symbolise direction of movement along the scanning path for example from pick area to scan area or from scan area to drop area. Animated icons may also symbolise the state of the current product being scanned. Suitable states may be "picked", "scanning", "scanned", "dropped". Animated icons may also be overlaid on various sections of the POS terminal. These animated icons correctly depict where the customer is going to hold/place the product such that optimal event or scan data is obtained. The lighting system may also be arranged to delimit all relevant areas and notify the relevant person (customer, shopping assistant etc.) of any irregularities (like placing an item outside the pick area).

In composition, a suitable lighting system may comprise a series of laser diodes used as a source for the necessary light, a series of clear lens and prisms, actuated by an intelligent system which focus the light on the various surfaces (pick area, drop area, scan area) and draws straight lines for delimiting said areas; a series of etched lens and prisms which refract the light in order to draw necessary icons on the till's surface: arrows to indicate direction on movement (left to right, right to left if a step in the scanning processed needs to be revised); words: STOP, CONTINUE, SCAN which depict the action which the customer should make; symbols: various symbols depicting either the location (pick, scan, drop area), the device (scanner) or the action to be taken (scan, move to the drop area etc.).

A contextual advertising module may be used in conjunction with the lighting system to display relevant advertisements to the customer at appropriate times during the scan process or outside it. For example, when the terminal is idle, the lighting system may display generic contextual information and advertisements based on the various configurable parameters such as the terminals location or relevant holiday (such as Easter or Christmas). When the terminal is in use, the lighting system may display generic contextual information and advertisements based on the item being scanned, the customer's profile (e.g. if he uses a store loyalty card) or other user or product specific information.

A plurality of sensors 210, 216 in the data acquisition unit are arranged to detect the light projected from the lighting system. These sensors include a global or environmental sensor system 210 and a local sensor system 216. These sensors provide a distance detection subsystem, a volume detection subsystem and a shape detection subsystem. In an example, and in response to the light detected from the lighting system, a determination is made as to whether the light has been obstructed by the placement of a product outside a desired area. Based on the determination, control parameters are generated. These control parameters are in turn used to generate a user alert to manage a correct sequence of actions. In addition to the event data generated by the sensors, the bar code scanner also provides information to the data acquisition unit, for example item code, name, price, quantity etc. Sensed information is also used to determine volume, shape and size. Collation of the event data is implemented such that correct data can be provided to the lighting system and the illumination units to guide the customer through the scanning process and ensure an efficient and accurate scan.

It will be appreciated that the lighting system may be recalibrated using software updates, item information updates (changes in size, stock etc.) or other information.

The plurality of sensors may comprise one or more local vision devices 216. These sensors or local vision devices are arranged to detect the volume of the product or object being scanned. As described below such an approximation may be implemented through a convex hull measurement. The local vision device or sensor may comprise any suitable input device incorporating for example image/infrared sensors such as a 2D camera, infrared cameras, 3D cameras or the like.

The data acquisition device also incorporates a global vision device or sensor 210. The global vision device or sensor facilitates surveillance of the environment around the POS terminal. It also facilitates object tracking and action recognition. The global vision device or sensor may comprise any suitable input device incorporating for example image/infrared sensors such as a 2D camera, infrared cameras, 3D cameras or the like. The combination of the event data obtained by the global and local sensors is used to determine distance, volume and shape information from the scanning process.

Optionally or additionally, the POS terminal may also include a client messaging device 212. Such a device facilitates system-user interaction. The device 212 is arranged to communicate with the user and may facilitate communication between the user and a third party for service assistance or the like. The device 212 may also suggest actions to the client for example guiding the client in order to get back to a regular sequence of steps or actions associated with a checkout operation or POS transaction. Suitable devices include displays, projectors, loudspeakers, touch screen displays or the like.

The processing unit may include a video analysis module, a guidance control module and a flow regularisation module. While for convenience below the processing unit is subdivided into individual modules, it will be appreciated that the functionality of these modules as described is not restricted to a single module within the processing unit and may combined into a single processing module. The functionality described below may be shared among a plurality of modules in any configuration. The processing unit may be any suitable computing device, microcontroller, server unit or the like.

The guidance control module generates control parameters to guide the shopper or user through the self-checkout process based on the event data generated by a plurality of sensors. The aim of guidance control is to minimise the confusion for the client. The illumination units are controlled to highlight the next operation area for the customer or user. For example, colour codes may be used to guide the user. The control parameters may be used to alter the illumination intensity or the colour of the individual illumination units. In an example, a first illumination unit could be highlighted green to show a user which area should be used for the next step of the scanning process. Other illumination units may be red to indicate that they are the incorrect units. In response to the event data collected by the sensors the guidance module generates one or more control parameters. These control parameters are also used to generate user alerts for the user of the terminal. These user alerts may be an illumination level for one or more of the illumination units as described above or may an audible or visual user alert for transmission by the client messaging device. The customer attention will be focused on specific areas in order to properly execute the current step in the scanning process. In addition, the customer is guided to a specific area in order to obtain better results for a certain operation. This task helps to improve some of the already obtained results. For example, if a customer scans the product, but computation of the object's volume by the processing device in response to the local vision sensors event data does not perform very well, in order to avoid an imminent incident detection, a suggestion may be made to the client to suggest a specific area where the product should be placed in order to re-compute the volume once again. The guidance module also facilitates the transition between the current operation area and the next one. Transitions between areas are very important. They can ensure a continuous flow between customer operations. Using the client messaging device, the guidance module can suggest to the client the right moment to move to the next operational area.

A further function of the guidance control module is to provide the customer with all necessary information regarding the scanning process. It will be appreciated that at each step the client is informed on the next legal action. In conjunction with the client messaging devices, a user message such as: "Please scan a product", or "Please drop the scanned product on the drop area", or "Have a nice day!" at the end of a transaction may be displayed, animated or broadcast. If something goes awry with the transaction the client may be informed as to what corrective action is required, for example with a message such as "The product was not scanned correctly". Furthermore, guidance control in association with the client messaging device may alert the client when incidents or irregularities of the checkout process are detected. Messages may also be transmitted to a supervisor or other staff member if assistance is required by the customer. In an embodiment, messages are transmitted using an instant messaging solution. This will be dependent on the user alert created in response to the event data.

The video analysis module is responsible for flow observation and incident detection. Information extraction is linked to self-checkout related actions. Information is extracted by the data acquisition unit. The information extracted at this point is then used to validate the drop of the correct product after the scanning operation. This module executes a plurality of algorithms based on event data acquired by the sensors, such as for example the global vision sensors.

For example, a first algorithm may extract the operator hand along the scanning path, i.e. from pick up to drop off of the product. Following extraction of the hand, object segmentation may be performed for the products. It will be appreciated that accurate real-time segmentation is important for obtaining reliable object descriptors. This accurate information is useable to detect fraud or irregularities in self checkout retail scenarios.

Foreground/background segmentation methods are arranged to exploit the fact that background data is much more stable than foreground data. This can be used in order to generate good background models. As a result, these methods considerably outperform general purpose video object segmentation methods, in both accuracy and speed. However, foreground/background segmentation fails to be accurate when the underlying assumptions of the method fail. Such cases include sudden illumination changes, camouflage (parts of foreground objects having similar features with background, like colour and texture) or when foreground objects stop moving or stay long enough in the field of view, to contaminate the background model. All the problems listed above occur frequently in retail surveillance applications. Dynamic backgrounds also pose big challenges to foreground/background segmentation. Background models are based on statistics accumulated in many frames in order to be reliable and therefore model adaptation is inherently slow. While methods have been proposed to solve some of these problems there is no solution to solve all, as evidenced in BOUWMANS, T. Recent advanced statistical background modeling for foreground detection; A systematic survey. Recent Patents on Computer Science. 2011, vol. 4, no. 3, p. 146-176.

To overcome the limitations of state of the art the present invention implements a controllable background using the illumination units in accordance with the present invention.

As an illustrative example consider two of the background planes, where object pixels are supposed to be segmented (for example, orthogonal illumination unit 204 and 208 of FIG. 2). As these illumination units are controllable, as background screens, they will always display known image patterns. Accordingly, the background to the product being scanned is known. As the background is an active light source, shadows have extremely low visibility on the background. Active backgrounds or illumination units can be designed to display patterns adapted to scene content, in order to facilitate object segmentation.

The controllable illumination units provide the active background. It will be appreciated that an important advantage of the active background is that the background image may be modulated by known signals, like sine waves or binary patterns. Modulating signals can be designed to generate low amplitude changes of the displayed intensities, sensed by the surveillance cameras, yet not beyond the 2% visual perception threshold. As opaque objects block the modulated light emitted by the displays, their outline can be extracted reliably. Translucent objects, on the other hand, highly distort the patterns displayed by the background screens, thereby being easily detected, as well.

Object features are extracted from segmented profiles. These features are event data and are subsequently used to crosscheck with information from till scanners as an alternative solution to weight scales. For example, given two orthogonal object outlines, a convex hull of the object can be computed, to help volumetric measurement.

Figure 4:
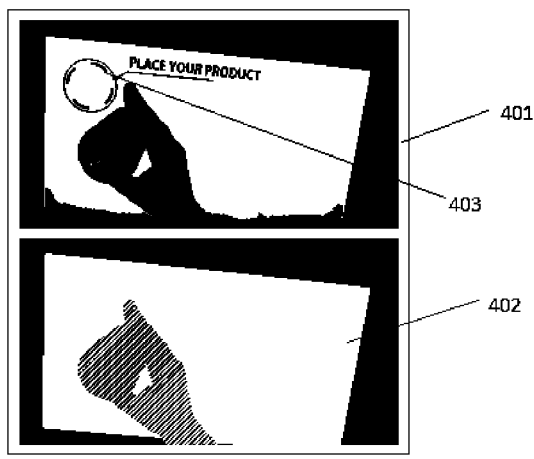
FIG. 4 illustrates a user guided scan in accordance with the present invention.

An additional advantage of the proposed background screens is the ease of camera calibration (both geometric and photometric). The controllable nature of the illumination panels provides a stable and well known background image. Stable foreground maps can then be obtained. An example of such foreground map obtained in accordance with the invention is shown in FIG. 4. Moreover, controlled background illumination assures that shadows cast by the operator or by different objects present around the terminal, will not influence the results of the background extraction algorithm, hence, making the result more stable.

An image of a user scanning a product is shown in FIG. 4, 401. The lighting system and the illumination units provide a guide 403 to indicate to the user where the product should be placed. Using the extraction techniques as outlined above a stable foreground map of the users hand and the product 403 is determined. The controlled illumination unit increases the stability of the system.

The processing unit also employs a tracking algorithm to track the product through the scanning path. The tracking algorithm for example may be triggered after the product has been scanned by the UPC/bar code scanner.

Figure 5:
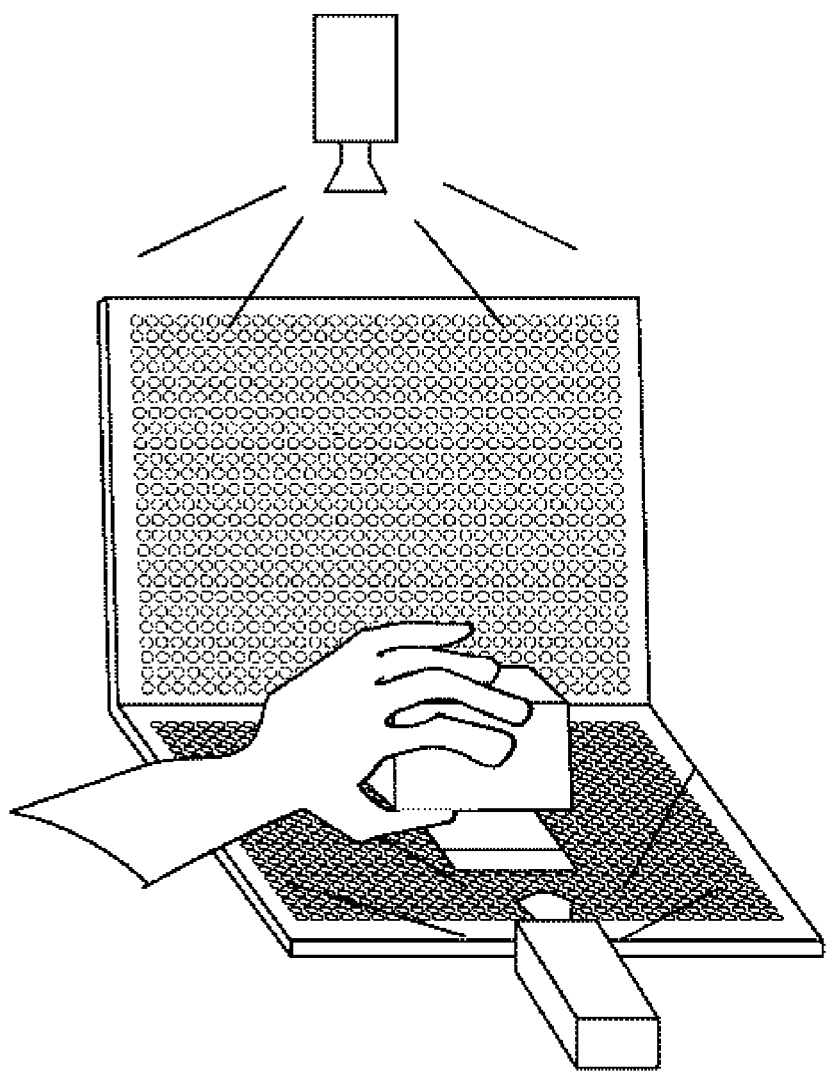
FIG. 5 illustrates a scanning process in accordance with the present invention.

The user's hand, holding the scanned product, is tracked while holding the scanned product to the predefined drop zone. An example of a hand, holding a product to be scanned is shown in FIG. 5. In response to this event data control data is generated (for example, in response to a determination that the previously scanned product has been placed in the drop area). Changes in the location or dimension of the drop area may also be taken into account in generating the control data. In one configuration the use of an illumination unit at the drop zone 208 further increases the accuracy and stability of tracking through the provision of an active background as outlined above.

As outlined above, data acquisition device senses event data during a scan. For example, in FIG. 2, orthogonal illumination units are provided. These orthogonal illumination units facilitate a volumetric measurement of the product being scanned. The product volume is obtained and measured in terms of "illumination matrix pixels" by the processing module. It will be appreciated that the volumetric measure may be slightly corrupted by the presence of the hand, but it will further be appreciated that this error is a systematic one. As outlined below this does not affect subsequent decisions drawn from this measurement. These volumetric measurements are used to confirm that the scanned product is actually the correct product. This is useful for example where bar codes have been replaced mistakenly on a product.

In accordance with a preferred embodiment of the invention the determination of the volumetric measurement is carried out concurrently with the UPC scan. The guidance system previously discussed ensures that the user holds the products in a stable position, (for example barcode facing the scanner). This means that same products will be measured while held in the same position and possible measurement errors will be comparable, validating furthermore the robustness of the product confirmation strategy.

In one configuration a learning approach is implemented wherein a number of measurements are stored in a memory location and subsequent measurements are compared with the stored measurements. In response to this comparison it is determined that the product is the same as or different to previous products.

The data acquisition system in accordance with the present invention comprises a series of specialized sensors which can detected the shape, size and volume of any object which is placed/held in front of them.

The volume/shape/size measurement through the combination of sensors is replicated on all the relevant areas (pick area, scan area, drop area) of the scanning path. Thus products are identified along the entire scan path and irregularities such as a non-scan can be determined.

The sensors (local and global) may comprises any combination of time-of-flight (TOF) 3D video cameras, infrared sensors and ultrasonic sensors. Thus the volume of the item being scanned, the distance from the scanner to the item and the level of the item can be determined.

The use of 3D video cameras enable distance-independent assessment of the characteristics of the object or the scene.

They form the basis for the three evaluation modes volume, distance and level, serving as solutions for different applications As an example, consider a pack of six water bottles presented for scanning. The guidance mechanisms outlined above guide the user to place the bottles in range of the sensors, for example, within 1.5 m of the sensors. Overlapping parts are detected as well as overfill and underfill. The volume of the product and/or individual components of the product is determined and an image map created using the techniques outlined above. In an embodiment of the invention, the field of view of the sensors may be subdivided to detect areas of interest and/or areas of no interest. For example, 64 subdivisions/windows may be used. These windows can be monitored and varied in response to control data. The volumetric measurements are compared with predefined parameters for the product. Irregularities can therefore be detected, for example a bottle missing from the crate. In response to the missing bottle a user alert is generated. This user alert may alert the user to rescan or alert a supervisor that the product needs to be checked. In response to this alert for example, further operations may be halted or prohibited until the cause of the notification has been removed or silenced.

The data acquisition system may also be arranged to detect shapes in the environment of the terminal. For example the customer may be scanned. If the user for example is holding a product in their hand which has not been scanned further alerts may be enacted.

In response to the acquired data, flow regularisation is enacted. As described above flow regularisation is controlled based on the event data obtained from the scanners. Additional validation points may be inserted along the scanning path as the customer is guided using the combination of lighting systems and the illumination units. Event data is obtained at one or more predefined points. This event data is compared with validation thresholds to determine whether an incident has been detected. In response to the comparison control data is generated and used to calibrate or alter the sensors or illumination units and a user alert may be generated.

Thus, individual acts of the methods described above may be used for some applications, irrespective of whether the other acts are also performed.

The above-described embodiments of the present technology can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be genetically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above. In this respect, it should be appreciated that one implementation of the embodiments of the present technology comprises at least one computer-readable storage medium (e.g., a computer memory, a floppy disk, a compact disk, a tape, a flash drive, etc.) encoded with a computer program (i.e., a plurality of instructions), which, when executed on a processor, performs the above-discussed functions of the embodiments of the present technology. The computer-readable storage medium can be transportable such that the program stored thereon can be loaded onto any computer resource to implement the aspects of the present technology discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the technology.

While various inventive embodiments have been described and illustrated herein, those of ordinary skill in the art will readily envision a variety of other means and/or structure for performing the function and/or obtaining the results and/or one or more of the advantages described herein, and each of such variations and/or modifications is deemed to be within the scope of the inventive embodiments described herein. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present technology are directed to each individual feature, system, article, material, kit, and/or method described herein. In addition, any combination of two or more such features, systems, articles, materials, kits, and/or methods, if such features, systems, articles, materials, kits, and/or methods are not mutually inconsistence, is included within the inventive scope of the present disclosure. All definitions, as defined and used herein, should be understood to control over dictionary definitions, definitions in documents incorporated by reference, and/or ordinary meanings of the defined terms. The words "comprises/comprising" and the words "having/including" when used herein with reference to the present invention are used to specify the presence of stated features, integers, steps or components but does not preclude the presence or addition of one or more other features, integers, steps, components or groups thereof. It is appreciated that certain features of the invention, which are for clarity, described in the context of separate embodiments, may also be provided in combination in a single embodiment. Conversely, various features of the invention which are, for brevity described in the context of a single embodiment, may also be provided separately or in any suitable combination.

What is claimed is:

1. A POS terminal for a retail environment, the POS terminal having a scanning path defined by an entry point and an exit point, the entry point being a product pick up area where a user picks up a product and the exit point being the point at which the user drops off the product, the POS terminal comprising:

a data acquisition device for generating event data as an output of user implemented product scan of the product along the scanning path of the POS terminal from the entry point to the exit point, the entry point being an object pick up area from where the user picks a product to be scanned and the exit point being an object drop off area where the user drops off the product; and a processing unit for receiving at least a portion of the event data from the data acquisition device and processing the event data according to a set of pre-defined rules, the event data including a shape, size and volume of the product and a parameter relating to the user as the product is scanned along the scanning path from the entry point to the exit point, the parameter comprising a measurement of a hand of the user;

the data acquisition device comprising:

a universal product code scanner (UPC) for scanning a barcode of the product;

a plurality of respective illumination units located at a respective plurality of points along the scanning path, the plurality of respective illumination units including:

a first illumination unit located at the entry point of the scanning path, the first illumination unit defining a first planar surface and comprising a first active light source for providing illumination to guide the user along the scanning path;

a second illumination unit located at the exit point of the scanning path, the second illumination unit defining a second planar surface and comprising a second active light source for providing illumination to guide the user along the scanning path;

a third illumination unit located at a third point along the scanning path between the entry point and the exit point, the third illumination unit defining a third planar surface oriented parallel to the first and second planar surfaces, and comprising a third active light source for providing illumination to guide the user along the scanning path; and a fourth illumination unit located at a fourth point along the scanning path adjacent the third illumination unit between the entry point and the exit point, the fourth illumination unit defining a fourth planar surface oriented perpendicular to the third planar surface, and comprising a fourth active light source for providing illumination to guide the user along the scanning path;

a plurality of sensors located along the scanning path at each of the respective points, said sensors configured to sense the event data along the scanning path; and wherein processing the event data comprises:

determining a control parameter for the POS terminal in response to the event data; and controlling the plurality of illumination units to display a light pattern in response to the determined control parameter, the plurality of illumination units providing active background screens;

tracking the user's hand while the user holds the product from the entry point to the exit point through the provision of the active background screens; and generating a user alert based on the control parameter and communicating the user alert to the user.

2. The terminal according claim 1 wherein the plurality of sensors comprises a distance detection subsystem for detecting a distance of the product from the distance detection subsystem and wherein the processing unit is arranged to generate a control parameter based on a comparison between the distance detected and a predefined threshold and generate user alert if the distance is greater than the threshold.

3. The terminal according to claim 1 wherein the plurality of sensors comprises a volume detection subsystem for determining a volume of at least a portion of the product and wherein the processing unit is arranged to generate a control parameter based on a comparison between the determined volume and a predefined volume and generate a user alert if the comparison is outside a limit defined by an upper or lower threshold.

4. The terminal according to claim 1 wherein the plurality of sensors comprises a shape detection subsystem for determining a shape of at least a portion of the product and wherein the processing unit is arranged to generate a control parameter based on a comparison between the determined shape and a predefined shape and generate a user alert if the comparison is outside a limit defined by an upper or lower threshold.

5. The terminal according to claim 4 wherein the shape detection subsystem is further arranged to scan the user of the terminal to obtain the parameter relating to the user.

6. The terminal according to claim 1 wherein the user alert comprises an illumination pattern and communicating the user alert comprises illuminating one or more of the plurality of illumination units to guide the user along the scanning path.

7. The terminal according to claim 1 wherein generating a user alert comprises selecting an illuminating unit of the plurality of illuminating units based on the control parameter and wherein communicating the user alert comprises illuminating the selected illuminating unit.

8. The terminal according to claim 1 wherein at least one of the plurality of illumination units is arranged to display a predetermined image pattern to the user.

9. The terminal according to claim 8 wherein the processing unit is arranged to apply a modulation signal to the predetermined image.

10. The terminal according to claim 1 wherein at least one of the plurality of sensors comprises an input device having one or more image/infrared sensors, a two-dimensional camera, an infrared camera, or a three dimensional camera.

11. The terminal according to claim 1 further comprising a communication device for transmitting an audible alert to the user.

12. The terminal according to claim 11 wherein the communication device comprises a display, a projector, a two way speaker, a microphone, or a loud speaker.

13. The terminal according to claim 1 wherein the processing unit further comprises a video analysis module.

14. The terminal according to claim 1 wherein the plurality of sensors comprise a laser guide lighting system.

15. The terminal according to claim 1 wherein the processing device comprises a laptop, a personal computer, a tablet computer, a personal communication device, a wireless communication device or a microcontroller.

16. The terminal according to claim 1 further comprising at least one of a cash dispenser, a graphical user interface, a touch screen, a cashless payment device, a speaker or a microphone.

17. The terminal according to claim 1 wherein the illumination units comprise one or more of a Light Emitting Diode, LED, mat or a Liquid crystal display.

18. The terminal according to claim 1 wherein the processing unit is arranged for controlling an illumination level of each of the plurality of illumination units in response to the control parameter.

19. The terminal according to claim 1 wherein the processing unit comprises a video analysis module, a guidance control module and a flow regularisation module.

20. A system for flow regularisation in a self-checkout retail environment, the environment including at least one global vision sensor and at least one local vision sensor, the system comprising:

a guidance module, a video analysis module and a flow regularisation module;

wherein the video analysis module includes one or more computing devices, microcontrollers or server units that obtain event data as an output of a user implemented product scan of a product along a scanning path of a POS terminal, the event data comprising a combination of user information received from a global vision sensor relating to an action of a user scanning the product along the scanning path, the scanning path defined by an entry point and an exit point, the entry point being a product pick up area where a user picks up a product and the exit point being the point at which the user drops off the product, and product information received from a local vision sensor relating to the product, said product information including a volume of the product and providing the event data to the flow regularisation module and the guidance module;

the flow regularisation module includes one or more computing devices, microcontrollers or server units that, in response to receiving at least a portion of the event data from the video analysis module, process the event data and determine a control parameter for the guidance module based on a comparison between the event data obtained by the video analysis module at a plurality of points along the scanning path and predefined data relating to a retail transaction; and wherein the guidance module includes one or more computing devices, microcontrollers or server units that, in response to receiving the determined control parameter from the flow regularisation module, actively guide the user while scanning the product based on the determined control parameters, wherein said guidance module controls a plurality of respective illumination units located at a respective plurality of points along the scanning path to selectively illuminate the scanning path at the respective plurality of points, the plurality of respective illumination units including:

a first illumination unit located at the entry point of the scanning path, the first illumination unit defining a first planar surface and comprising a first active light source for providing illumination to guide the user along the scanning path;

a second illumination unit located at the exit point of the scanning path, the second illumination unit defining a second planar surface and comprising a second active light source for providing illumination to guide the user along the scanning path;

a third illumination unit located at a third point along the scanning path between the entry point and the exit point, the third illumination unit defining a third planar surface oriented parallel to the first and second planar surfaces, and comprising a third active light source for providing illumination to guide the user along the scanning path; and a fourth illumination unit located at a fourth point along the scanning path adjacent the third illumination unit between the entry point and the exit point, the fourth illumination unit defining a fourth planar surface oriented perpendicular to the third planar surface, and comprising a fourth active light source for providing illumination to guide the user along the scanning path;

wherein the video analysis module receives event data from a plurality of sensors including the global vision sensor and the local vision sensor located along the scanning path at each of the respective points, said sensors configured to sense the event data along the scanning path; and wherein processing the event data by the flow regularization module further comprises:

determining a control parameter for the POS terminal in response to the event data; and controlling the plurality of illumination units to display a light pattern in response to the determined control parameter received by the guidance module, the plurality of illumination units providing active background screens;

tracking a hand of the user while the user holds the product from the entry point to the exit point through the provision of the active background screens; and generating a user alert based on the control parameter and communicating the user alert to the user.

21. The system according to claim 20 wherein the system is integrateable with existing self-checkout environments.

22. The system according to claim 20 wherein the guidance module comprises an active background, said active background being arranged to display a light pattern in response to the control parameter.

23. The system according to claim 22 wherein the light pattern is modulated by the guidance module.

24. The system according to claim 22 wherein the light pattern is detectable by a camera.

25. A method for flow regularisation in a self-checkout retail environment, comprising:

obtaining event data as an output of a user implemented product scan of a product along a scanning path of a POS terminal, the event data comprising user information relating to an action of a user scanning the product along the scanning path and product information relating to the product, the scanning path defined by a plurality of points including an entry point and an exit point, the entry point being a product pick up area where a user picks up a product and the exit point being the point at which the user drops off the product and product information relating to the product, said product information including a volume of the product;

determining a control parameter for the POS terminal based on a comparison between the event data obtained at the plurality of points, and predefined data relating to a retail transaction; and implementing an active guidance system to guide the user while scanning the product, said active guidance configured to control a plurality of respective illumination units located at a respective plurality of points along the scanning path for illuminating the scanning path at the respective plurality of points, the plurality of respective illumination units including:

a first illumination unit located at the entry point of the scanning path, the first illumination unit defining a first planar surface and comprising a first active light source for providing illumination to guide the user along the scanning path;

a second illumination unit located at the exit point of the scanning path, the second illumination unit defining a second planar surface and comprising a second active light source for providing illumination to guide the user along the scanning path;

a third illumination unit located at a third point along the scanning path between the entry point and the exit point, the third illumination unit defining a third planar surface oriented parallel to the first and second planar surfaces, and comprising a third active light source for providing illumination to guide the user along the scanning path; and a fourth illumination unit located at a fourth point along the scanning path adjacent the third illumination unit between the entry point and the exit point, the fourth illumination unit defining a fourth planar surface oriented perpendicular to the third planar surface, and comprising a fourth active light source for providing illumination to guide the user along the scanning path;

wherein obtaining event data further comprises sensing the event data at the plurality of points along the scanning path using a plurality of sensors located at different points along the scanning path and processing the event data; and wherein implementing an active guidance system further comprises controlling the plurality of illumination units to display a light pattern in response to the determined control parameter, the plurality of illumination units providing active background screens;

tracking a hand of the user while the user holds the product from the entry point to the exit point through the provision of the active background screens; and generating a user alert based on the control parameter and communicating the user alert to the user.

26. The method according to claim 25 wherein implementing an active guidance system comprises displaying a light pattern in response to the control parameter.

27. The method according to claim 25 further comprising modulating the light pattern.

28. A non-transitory computer readable programmable medium carrying a computer program stored thereon which when executed by a processing module implements the operations of:

obtaining event data as an output of a user implemented product scan of a product along a scanning path of a POS terminal, the event data comprising user information relating to an action of the user scanning the product along a scanning path and product information relating to the product, the scanning path defined by a plurality of points including an entry point and an exit point, the entry point being a product pick up area where a user picks up a product and the exit point being the point at which the user drops off the product, and product information relating to the product, said product information including a volume of the product;

determining a control parameter for the POS terminal based on a comparison between the event data obtained at the plurality of points, and predefined data relating to a retail transaction; and implementing an active guidance system to guide the user while scanning the product, said active guidance configured to control a plurality of respective illumination units located at a respective plurality of points along the scanning path for illuminating the scanning path at the respective plurality of points, the plurality of respective illumination units including:

a first illumination unit located at the entry point of the scanning path, the first illumination unit defining a first planar surface and comprising a first active light source for providing illumination to guide the user along the scanning path;

a second illumination unit located at the exit point of the scanning path, the second illumination unit defining a second planar surface and comprising a second active light source for providing illumination to guide the user along the scanning path;

a third illumination unit located at a third point along the scanning path between the entry point and the exit point, the third illumination unit defining a third planar surface oriented parallel to the first and second planar surfaces, and comprising a third active light source for providing illumination to guide the user along the scanning path; and a fourth illumination unit located at a fourth point along the scanning path adjacent the third illumination unit between the entry point and the exit point, the fourth illumination unit defining a fourth planar surface oriented perpendicular to the third planar surface, and comprising a fourth active light source for providing illumination to guide the user along the scanning path;

wherein obtaining event data further comprises sensing the event data at the plurality of points along the scanning path using a plurality of sensors located at different points along the scanning path and processing the event data; and wherein implementing an active guidance system further comprises controlling the plurality of illumination units to display a light pattern in response to the determined control parameter, the plurality of illumination units providing active background screens;

tracking a hand of the user while the user holds the product from the entry point to the exit point through the provision of the active background screens; and generating a user alert based on the control parameter and communicating the user alert to the user.

29. The POS terminal of claim 1, wherein the processing unit is further configured to validate the product scan based on comparison of event data at each of the plurality of points along the scanning path.

* * * * *